United States Patent [19]
Wehde

[11] 3,974,406
[45] Aug. 10, 1976

[54] ELECTRICAL MACHINE
[75] Inventor: Heinz Wehde, Rothenberg uber Michelstadt, Germany
[73] Assignee: Teldix GmbH, Heidelberg, Germany
[22] Filed: Apr. 11, 1975
[21] Appl. No.: 567,084

[30] Foreign Application Priority Data
Apr. 11, 1974 Germany............................ 2417818

[52] U.S. Cl................................ 310/67 R; 310/93; 310/156; 310/90
[51] Int. Cl.² ......................................... H02K 7/08
[58] Field of Search ............... 310/67, 43, 156, 190, 310/220, 198–208

[56] References Cited
UNITED STATES PATENTS
3,388,273  6/1968  Davis...................................... 310/67
3,596,121  7/1971  Chang................................. 310/67 X
3,891,876  6/1975  Herr et al. ............................ 310/43

Primary Examiner—Donovan F. Duggan
Attorney, Agent, or Firm—Spencer & Kaye

[57] ABSTRACT

In an electrical machine including a rotor, a plurality of permanent magnets mounted on the rotor, a stator spaced from the rotor by an air gap, and electrical windings disposed on the stator to be traversed by the magnetic fields of the permanent magnets, the rotor is elastically or resiliently held relative to the stator by a rotor bearing, the stator includes a stator body made of an electrically nonconductive and nonmagnetizable material for preventing hysteresis losses, eddy current losses, and magnetic reaction forces on the rotor, and the permanent magnets, the windings and stator are arranged for causing the magnetic fields of the permanent magnets to pass through the air gap between rotor and stator, the windings, and the stator body.

12 Claims, 2 Drawing Figures

ELECTRICAL MACHINE

BACKGROUND OF THE INVENTION

The present invention relates to an electrical machine, particularly for operation at high speed, of the type including a rotor on which permanent magnets are disposed and electrical windings disposed on the stator, the windings lying in regions traversed by the magnetic fields of the permanent magnets.

In electrical machines having a rotor provided with permanent magnets, the configuration and the arrangement of the windings on the stator must be given particular attention when consideration is given to simplifying production. For machines which are operated at high speed, the known iron and winding losses may become very high, in view of their dependence on the rotating speed, so that such machines often exhibit poor efficiency.

A particular problem arises in electrical machines which have a rotor that is resiliently mounted to have some freedom of movement in, for example, the radial direction. This type of mounting may produce radial forces of reaction against radial movements of the rotor and these forces must be absorbed by an appropriately designed bearing. The same problem also arises for rotors which are mounted to be movable in the axial direction or in directions perpendicular to the axis of rotation.

SUMMARY OF THE INVENTION

It is an object of the present invention to overcome the above-mentioned drawbacks.

A further object of the invention is to provide a machine which is simple in structure and easy to manufacture and which operates with high efficiency even at high rotational speeds.

Another object of the invention is to provide a machine in which, with a rotor mounted to be axially and/or radially yielding, forces which are directed so as to oppose the movement of the rotor, and which would otherwise have to be absorbed by the bearing and would reduce the efficiency of the machine, are avoided.

These and other objects according to the present invention are achieved in an electrical machine, including a rotor, a plurality of permanent magnets mounted on the rotor, a stator spaced from the rotor by an air gap, and electrical windings disposed on the stator to be traversed by the magnetic fields of the permanent magnets, by the improvement composed of a rotor bearing including means elastically or resiliently holding the rotor relative to the stator, and wherein the stator includes a stator body made of an electrically nonconductive and nonmagnetizable material for preventing hysteresis losses, eddy current losses, and magnetic reaction forces on the rotor, and the permanent magnets, the windings and the stator are arranged for causing the magnetic fields of the permanent magnets to pass through the air gap between rotor and stator, the windings, and the stator body.

The machine according to the present invention is distinguished by a particularly simple structure and operates efficiently even at high speed, since iron losses can be avoided. Since, furthermore, no special devices are required to divert or guide the magnetic flux from the windings, the weight of the stator can be made extremely low. At the same time, there results, particularly in the case of a machine designed to rotate at high speed and provided with a large number of poles, a very favorable specific weight.

Such an electrical machine may be used as generator or as motor, the control of the stator windings being effected in a known manner, for example, in the manner utilized for a synchronous motor. Preferably, however, the stator windings are controlled in the manner of a direct current motor without collectors. It has also been found to be very advantageous to have practically no radially or axially directed forces or inertial moments act on the rotor, but only tangential forces, so that bearing difficulties originating from eccentric magnetic radial forces are eliminated.

In a preferred embodiment it is proposed to combine the rotor directly with the driving or driven component. This eliminates the otherwise required bearings for an electrical machine. If the stator body is provided with grooves the production of the stator windings is facilitated in a known manner. Embodiments in which the stator windings have twisted wires are considered to be particularly advantageous since in this way the individual winding phases can be made symmetrical with respect to impedances. Moreover, the winding heads can thus be kept very small, which is an advantage for the weight and structural volume of the unit.

In a preferred embodiment of the machine the rotor and possibly the driving or the driven component rotate about the axis of greatest inertial moment so that bearing stresses are also extremely low.

DESCRIPTION OF THE PREFERRED EMBODIMENTS

Figure 1:
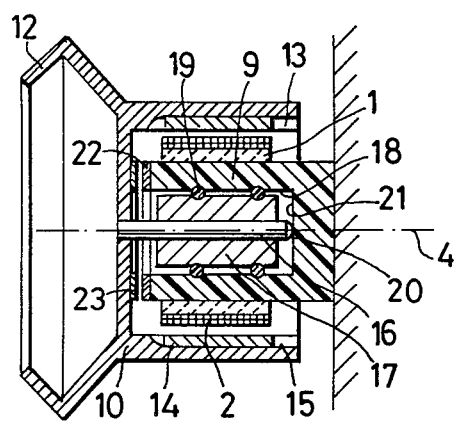
FIG. 1 is a simplified cross-sectional view of a machine according to the invention having an annular stator body to drive a spinning turbine.

FIG. 1 is a schematic representation of a machine according to the present invention having an annular stator body 1 with the electric stator winding 2 disposed on its outer surface. The stator body is made of a ceramic material and is provided with grooves (not shown) on its one outer surface, the grooves extending substantially parallel to the rotation axis 4. The winding is a three-phase wave winding and is disposed in the grooves and fastened therein by means of an adhesive.

The winding 2 is formed of a twisted bundle of insulated wires applied onto the stator body for each phase to correspond to the required number of windings. Upon completion of the application of the windings, they are connected together in the desired manner by series and/or parallel connections. In order to prevent eddy current losses and losses from current displacement in the windings, so-called high frequency stranded wire is preferably used.

The stator body 1 is disposed on a cylindrical mandrel 9 which is made of a nonconductive, and preferably also nonmagnetizable, material. The installation of the windings can be effected very easily since only the stator body 1 together with the previously applied windings 2 need be pushed onto the mandrel 9 and fastened in a suitable manner.

The winding 2 is enclosed by a hollow cylindrical rotor 10 which is directly connected with the driven component, for example a funnel-shaped spinning turbine 12 of an open-end spinning machine. On one inner surface the rotor is provided with grooves 13 which are distributed around its periphery and in which are disposed radially magnetized permanent magnets 14 having polarities which alternate from one magnet to the next in the peripheral direction. The bottoms of the grooves 13 are planar, or concentric with axis 4, so that the planar, or circular, rear surfaces of the permanent magnets 14 contact them and the permanent magnets, which are preferably made of hard magnetic ferrite or of samarium cobalt, are not destroyed even if the rotor rotates at high speed.

Since these magnets have a brittle structure, the magnets could be crumbled due to the centrifugal forces if these and the bottoms of the grooves are not well matched. The rotor 10 simultaneously provides the magnetic return paths for the permanent magnets. For this purpose a special ring may be provided on which the magnets are seated.

A spinning turbine is mounted to be rotatable about axis 4 through the intermediary of a pivot bearing including a pivot 16 and a slide bearing bushing 17. The bearing bushing 17 is elastically held in bore 18 of mandrel 9, for example by means of rings 19 of elastic material, so that the turbine and the rotor can rotate about the axis of the greatest inertial moment at supercritical speed. In order to fix the spinning turbine axially, an axially magnetized permanent magnet ring 22 is provided at the front end of mandrel 9 and produces a magnetic force which presses the turbine, under the influence of a soft-iron ring 23 and through the intermediary of pivot end 20 which may be spherical, against the bottom 21 of the blind bore 18. As shown, the machine according to the present invention has an extremely simple configuration.

As mentioned above the stator body 1 is made of a ceramic material, the rotor is made of aluminum, and the rings 19 are made of an elastic material such as, preferably, rubber.

Figure 2:
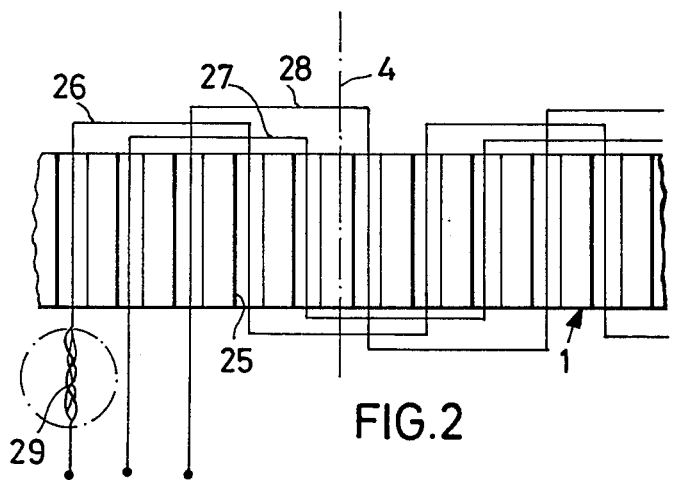
FIG. 2 is a schematic, developed, front view of a stator body having a three-phase wave winding.

FIG. 2 is a schematic representation of the stator body 1, with the surface of the stator body being developed to lie in the plane of the drawing. The stator body 1 is provided with grooves 25 which extend parallel to the axis of rotation 4. A multi-phase winding is disposed in the grooves and is composed of three phases 26, 27 and 28. For reasons of simplicity, only one electrical conductor or one winding, respectively, is shown in each groove. Each conductor is constituted by a number of thin wires 29 which are individually electrically insulated and each enclosed by a thin lacquer layer, in a known manner. The wires are twisted together. Such conductors are also called a high-frequency stranded wire and when they are used in the above manner there results the significant advantage that eddy currents in the windings are substantially prevented. If the rotor has a small unbalance the center axis 4 does not conform with the rotor's axis of greatest inertial moment. Because of the elastic rings 19, the rotating magnets 14 undergo radial movements with respect to the stator. Since the magnetic fields of said magnets are passing through the air gap, the winding and the stator body only and not through electrically conductive or magnetic material, said movements do not cause opposed electro-magnetic forces.

It will be understood that the above description of the present invention is susceptible to various modifications, changes and adaptations, and the same are intended to be comprehended within the meaning and range of equivalents of the appended claims.

What is claimed is:

1. In an electrical machine including a rotor, a plurality of permanent magnets mounted on the rotor, a stator spaced from the rotor by an air gap, and electrical windings disposed on the stator to be traversed by the magnetic fields of the permanent magnets, the improvement comprising a rotor bearing including means elastically holding said rotor relative to said stator, and wherein said stator comprises a stator body carrying said windings and made of an electrically nonconductive and nonmagnetizable material for preventing hysteresis losses, eddy current losses, and magnetic reaction forces on said rotor, and said permanent magnets, said windings and said stator are arranged for causing the magnetic fields of said permanent magnets to pass through the air gap between rotor and stator, said windings, and said stator body, and further wherein each said winding is composed of at least one conductor constituted by a plurality of wires which are electrically insulated from one another and which are twisted together.

2. Electrical machine as defined in claim 1 wherein said stator body is annular in form.

3. Electrical machine as defined in claim 2 wherein said stator body is a hollow cylinder of ceramic material and said windings are disposed on the outer cylindrical surface of said stator body.

4. Electrical machine as defined in claim 3 wherein said stator body is made of a material having good heat conductivity.

5. Electrical machine as defined in claim 2 wherein said rotor is provided with a large number of grooves extending parallel to the axis of rotation of said rotor, there is a large number of said permanent magnets each disposed in a respective rotor groove, and further comprising a ring of ferromagnetic material fastened to said rotor and providing a magnetic return path for the flux produced by said permanent magnets.

6. Electrical machine as defined in claim 5 wherein said rotor is disposed coaxially to said stator body, said air gap exists between said rotor and said stator body, and the axis of rotation of said rotor coincides substantially with the axis of greatest inertial moment of said rotor.

7. In an electrical machine including a rotor, a plurality of permanent magnets mounted on the rotor, a stator spaced from the rotor by an air gap, and electrical windings disposed on the stator to be traversed by the magnetic fields of the permanent magnets, the improvement comprising a rotor bearing including means elastically holding said rotor relative to said stator, and wherein said stator is provided with a cylindrical, axially-extending bore and said stator comprises a stator body made of an electrically nonconductive and nonmagnetizable material for preventing hysteresis losses, eddy current losses, and magnetic reaction forces on said rotor, and said permanent magnets, said windings and said stator are arranged for causing the magnetic fields of said permanent magnets to pass through the air gap between rotor and stator, said windings, and said stator body, and wherein said means elastically holding said rotor comprise: a cylindrical bearing bushing disposed in said bore; at least one ring of elastic material enclosing said bushing and holding said bushing in said bore; and a cylindrical, axially-disposed bearing pin fixed to, and supporting, said rotor and rotatably mounted in said bushing.

8. Electrical machine as defined in claim 1 further comprising a driven component connected directly to, and integral with, said rotor.

9. In an electrical machine including a rotor, a plurality of permanent magnets mounted on the rotor, a stator spaced from the rotor by an air gap, and electrical windings disposed on the stator to be traversed by the magnetic fields of the permanent magnets, the improvement comprising a rotor bearing including means elastically holding said rotor relative to said stator, and a driven component connected directly to, and integral with, said rotor and constituting a funnel-shaped spinning turbine of an open-end spinning machine, and wherein said stator comprises a stator body made of an electrically nonconductive and nonmagnetizable material for preventing hysteresis losses, eddy current losses, and magnetic reaction forces on said rotor, and said permanent magnets, said windings and said stator are arranged for causing the magnetic fields of said permanent magnets to pass through the air gap between rotor and stator, said windings, and said stator body.

10. Electrical machine as defined in claim 1 wherein said stator body is provided with grooves which extend parallel to the axis of rotation of said rotor, and said electric windings are disposed in said grooves.

11. Electrical machine as defined in claim 10 wherein said windings are formed as a multiphase wave winding.

12. Electrical machine as defined in claim 1 wherein each said conductor is constituted by a high frequency stranded wire.

* * * * *